Dec. 26, 1950  R. E. HUSTON  2,535,419
MANUALLY PROPELLED IMPLEMENT HANDLE
Filed Nov. 15, 1946  2 Sheets-Sheet 1
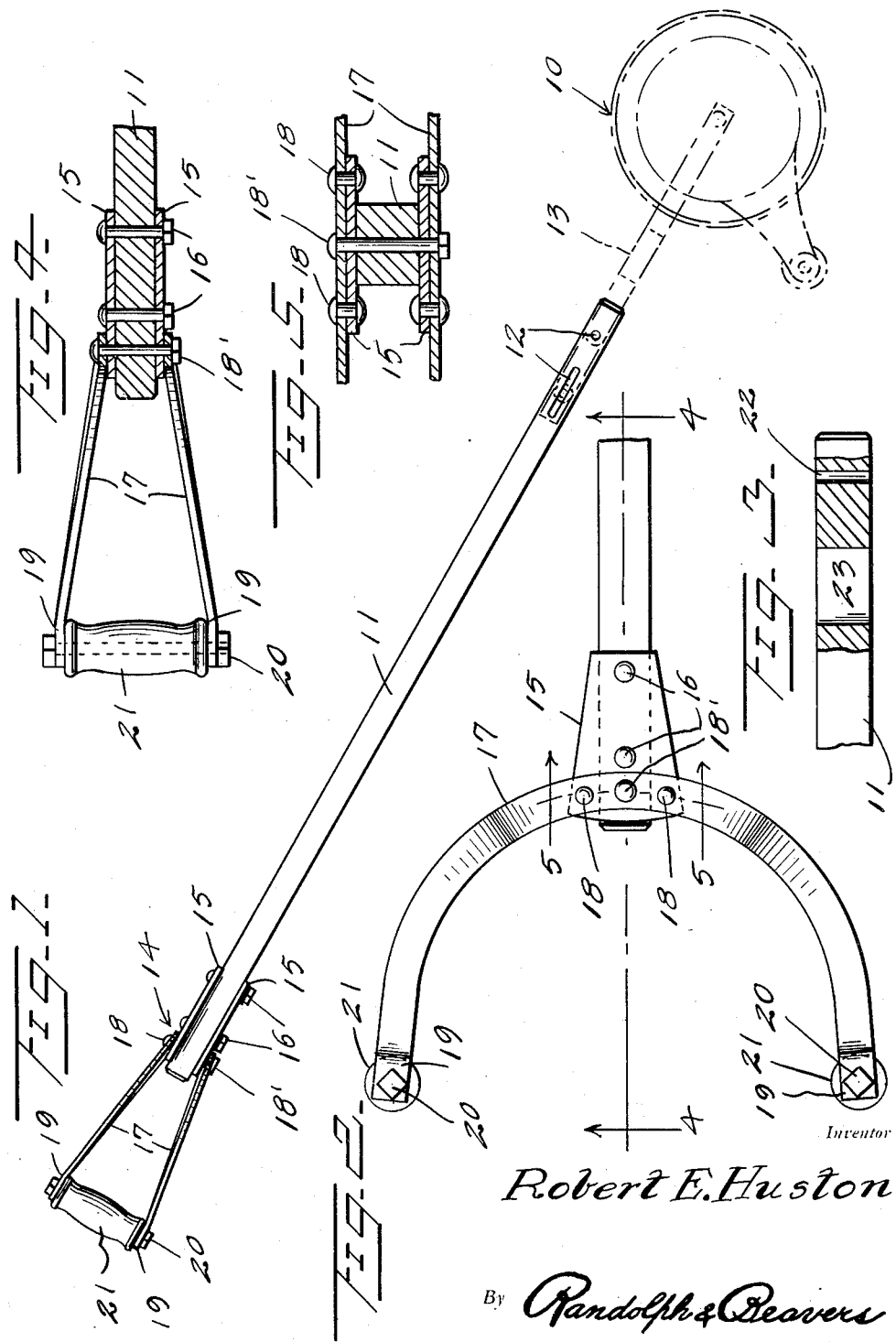
Inventor
Robert E. Huston
By Randolph & Beavers
Attorneys

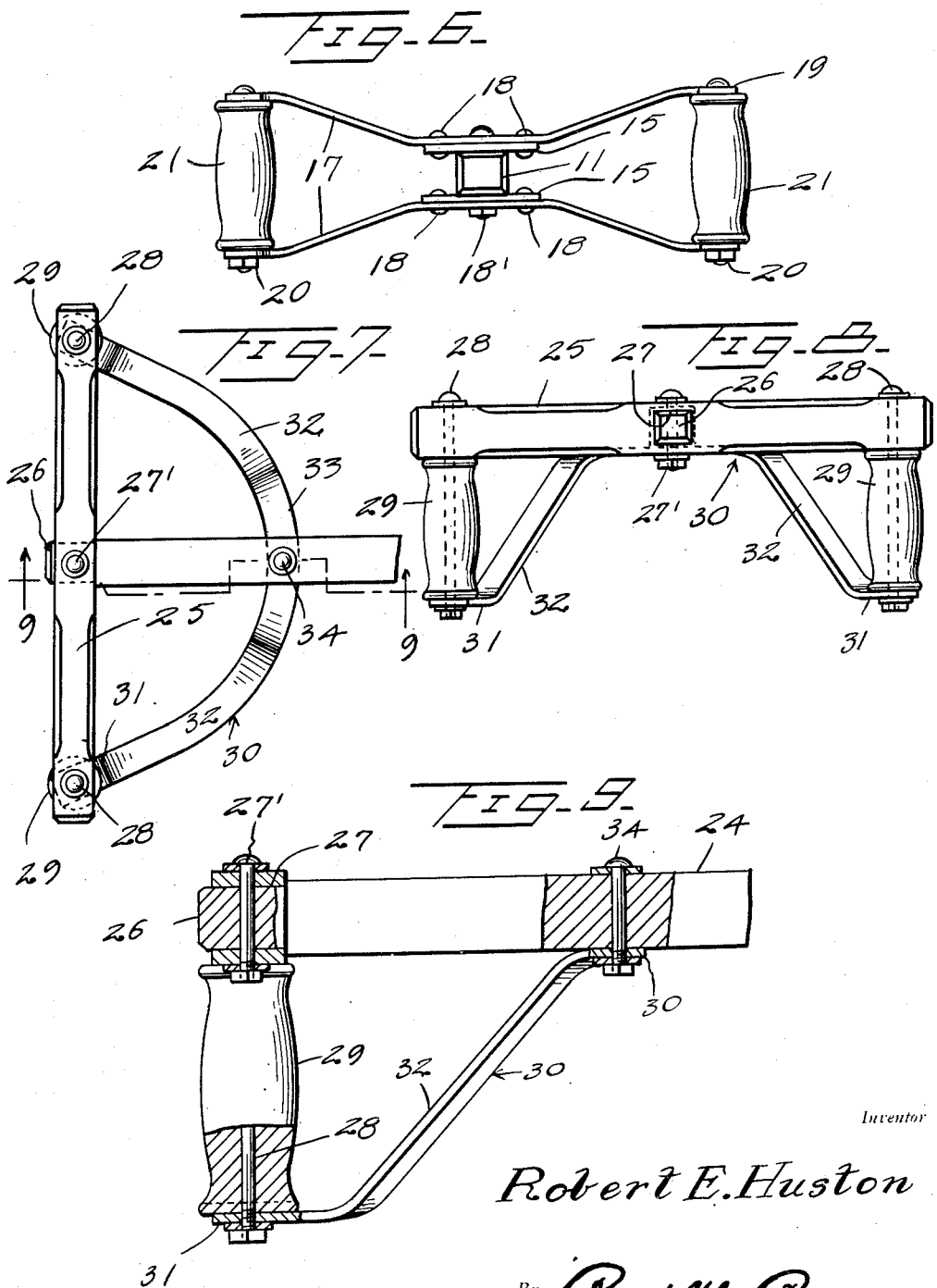

Patented Dec. 26, 1950

2,535,419

UNITED STATES PATENT OFFICE 2,535,419

MANUALLY PROPELLED IMPLEMENT HANDLE

Robert E. Huston, Henderson, Tex.

Application November 15, 1946, Serial No. 710,054

1 Claim. (Cl. 16—111)

This invention relates to a novel construction of handle for use with manually propelled implements, such as lawn or garden implements and especially intended and adapted for use on manually propelled lawn mowers.

More particularly, it is an object of the invention to provide a handle having hand grips which are disposed substantially perpendicular to the longitudinal axis of a handle shank and which are laterally offset on either side of the handle shank to afford a means whereby a substantially direct force may be exerted by the body of the user outwardly from the shoulders through the arms, wrists and hands to said hand grips.

A particular advantage of the invention resides in the fact that the arms and wrists do not have to be flexed in order to comfortably engage the hand grips and exert a pushing force thereon, thus considerably reducing fatigue, especially in the arms, hands and wrists.

Another advantage of the invention resides in the fact that the hand grips afford the user a more effective control of the mower or implement enabling the implement to be guided and turned more readily.

Various other objects and advantages of the invention will hereinafter become more fully apparent from the following desciption of the drawings, illustrating the preferred embodiment thereof, and wherein:

Figure 1 is a side elevational view showing the improved handle in combination with a conventional type manually propelled lawn mower;

Figure 2 is a fragmentary top plan view of the handle;

Figure 3 is a fragmentary top plan view, partly in horizontal section of the end of the handle shank which is attached to the fork or yoke of the lawn mower;

Figure 4 is a longitudinal sectional view taken substantially along a plane as indicated by the line 4—4 of Figure 2;

Figure 5 is a cross sectional view taken substantially along a plane as indicated by the line 5—5 of Figure 2;

Figure 6 is an end elevational view looking toward the outer end of the handle;

Figure 7 is a plan view, similar to Figure 2, of another embodiment of the invention;

Figure 8 is an end elevational view thereof, similar to Figure 6, and

Figure 9 is a longitudinal sectional view, taken substantially along a plane as indicated by the line 9—9 of Figure 7.

Referring more specifically to the drawings and first with reference to Figures 1 to 6, inclusive, 10 designates generally a conventional lawn mower having an elongated handle 11 which is connected at its inner, lower end by suitable fastenings 12 to the shank portion of the fork 13 of a lawn mower. The elongated handle 11 may be of conventional type employed on lawn mowers.

The improved handle, designated generally 14 and comprising the invention, includes a pair of bracket plates 15 which are attached to the top and bottom sides of the handle shank 11 at its opposite, outer end, by means of a plurality of nut and bolt fastenings 16. The shank portion 11 may form a part of the improved handle 14 or the conventional shank portion of a lawn mower may be utilized by merely removing the cross bar at the outer end thereof and which forms the hand grip of conventional lawn mower handles, and attaching the plates 15 thereto, as illustrated in the drawings and as previously described.

A pair of substantially corresponding arcuate shaped bars 17 are fastened, intermediate of their ends, to the base plates 15 and on the outer sides thereof by means of a plurality of rivets or other fastenings 18 and a nut and bolt fastening 18', which also extends through shank 11.

The ends of the bars 17 extend outwardly and are curved rearwardly with respect to the rear end of the shank 11 and as best seen in Figures 1 and 4, the complementary ends of the bars 17 are disposed in outwardly diverging relationship to one another and terminate in apertured substantially parallel terminal portions 19. A nut and bolt fastening 20 extends through the aligned apertures of the complementary terminal portions 19 of said bars 17 and a hand grip 21 is interposed between said complementary terminal portions 19 at each end of the yoke, formed by the bars 17, and each of said handle portions or grips 21 is secured in position by the shank of the bolt of the fastening 20 extending therethrough, as indicated in dotted lines in Figure 4.

If the handle shank 11 constitutes a part of the improved handle 14, the inner, forward end thereof is preferably provided with a transverse bore 22, adjacent said end, and a transverse, longitudinally extending slot 23, which is spaced from the bore 22. The bore 22 is adapted to receive one of the fastenings 12 and the slot 23 is provided to receive the other fastening and is formed as a slot, rather than a bore, to accommodate yokes 13 having fastenings 12 spaced different distances apart.

The hand grips 21 are spaced laterally a distance substantially equal to the space between a man's arms, so that the user in grasping the hand grips 21 will have his arms positioned substantially parallel from shoulder to wrist. The grips 21 are disposed substantially perpendicular to the longitudinal axis of the handle shank 11 and generally vertically so that the hand grips 21 may be grasped and conveniently held with the arms and wrists substantially straight. Consequently in pushing the lawn mower 10 a substantially direct pushing force can be exerted in substantially a straight line from the shoulders, through the arms, wrists and hands against the grips 21, thus enabling the lawn mower to be operated with a minimum of fatigue to the shoulders, arms, wrists and hands. Further, the spacing of the hand grips 21 will facilitate the turning and guiding of the lawn mower and the efficient operation thereof around and adjacent obstructions and thus greatly increase the maneuverability of the mower.

A slightly modified form of the invention is illustrated in Figures 7, 8 and 9 wherein the outer, upper end of a handle shank, designated generally 24 is shown provided at its outer end with a cross bar 25. The handle shank 24 corresponds to the handle shank 11 except that the outer end thereof is provided with a restricted extension 26 which extends through a transverse opening 27 which is formed in the cross bar 25 intermediate of the ends of the latter. A fastening 27' extends through crossbar 25 and extension 26 to detachably secure the cross bar to the shank 24. The cross bar 25 is preferably of a greater length than the conventional cross bar or lawn mower handle and which is formed with the hand grips thereof. The ends of the cross bar 25 are provided with nut and bolt fastenings 28 which extend downwardly therethrough below the underside of the bar 25 and which support hand grips 29 thereon. The hand grips 29 correspond substantially to the hand grips 21 and the shanks of the fastenings 28 extend therethrough, as seen in Figure 9, to support the grips 29 in positions depending from and substantially perpendicular to the ends of the cross bar 25. The hand grips 29 and their supporting fastenings 28 are preferably braced at the lower ends of said parts by a bar 30 having downwardly offset terminals which are apertured to receive the shanks of the fastenings 28 and which terminals 31 are secured against the lower ends of the hand grips 29. The bar 30 includes upwardly inclined converging portions 32 which extend from the terminals 31 obliquely toward the handle shank 24 and which merge with the ends of an arcuate intermediate portion 33 of the bar 30. The intermediate part of the arcuate portion 33 is disposed against the underside of the shank 24 at a distance from the cross bar 25 and is secured thereto by means of a suitable nut and bolt fastening 34, so that the bar 30 forms a brace between each of the hand grips 29 and the handle shank 24.

It will be readily obvious that the handle as illustrated in Figures 7, 8 and 9 is adapted to be utilized in the same manner and for the same purpose as previously described in reference to the handle 14 and that the hand grips 29 may be spaced approximately the same distance apart as the hand grips 21.

Various other modifications and changes are likewise contemplated and may obviously be resorted to, without departing from the spirit and scope of the invention as hereinafter defined by the appended claims.

I claim:

An attachment for the elongated handle shank of a lawn mower, garden implement or the like, comprising a pair of plates adapted to be detachably secured to opposite surfaces of an elongated handle shank adjacent one of the ends of the handle shank, a pair of bars secured to the exposed sides of the said plates, intermediate of the ends of the bars and transversely of the plates and handle shank, and a hand grip detachably mounted between each pair of complementary ends of said bars, said hand grips being disposed in laterally spaced relationship to one another and to the handle shank and with their axes perpendicular to the axis of the handle shank.

ROBERT E. HUSTON.

REFERENCES CITED

The following references are of record in the file of this patent:

UNITED STATES PATENTS

| Number | Name | Date |
|---|---|---|
| 271,471 | Johnston | Jan. 30, 1883 |
| 574,751 | Newman | Jan. 5, 1897 |
| 576,573 | Gould | Feb. 9, 1897 |
| 1,039,971 | Leyner | Oct. 1, 1912 |
| 1,262,230 | Muhl | Apr. 9, 1918 |
| 2,133,010 | Barry | Oct. 11, 1938 |
| 2,387,748 | Cuddigan et al. | Oct. 30, 1945 |

FOREIGN PATENTS

| Number | Country | Date |
|---|---|---|
| 667,865 | Germany | Nov. 21, 1938 |
| 348,096 | France | Mar. 1, 1905 |